Nov. 23, 1965 W. S. BERRY ETAL 3,219,103
AIR CONDITIONING APPARATUS FOR AUTOMOTIVE VEHICLE
Filed Sept. 27, 1963 3 Sheets-Sheet 1

RUSSELL D. FOLEY, INVENTORS
WALLACE S. BERRY, WILLIAM J. ZECHEL
LEROY J. HERBON, ARTHUR R. HATCH,
BY STANLEY R. KEENEY

ATTORNEY

Nov. 23, 1965 W. S. BERRY ETAL 3,219,103
AIR CONDITIONING APPARATUS FOR AUTOMOTIVE VEHICLE
Filed Sept. 27, 1963 3 Sheets-Sheet 2

RUSSELL D. FOLEY, INVENTORS
WALLACE S. BERRY, WILLIAM J. ZECHEL
LEROY J. HERBON, ARTHUR R. HATCH,
STANLEY R. KEENEY
BY
Carl J. Burbee
ATTORNEY

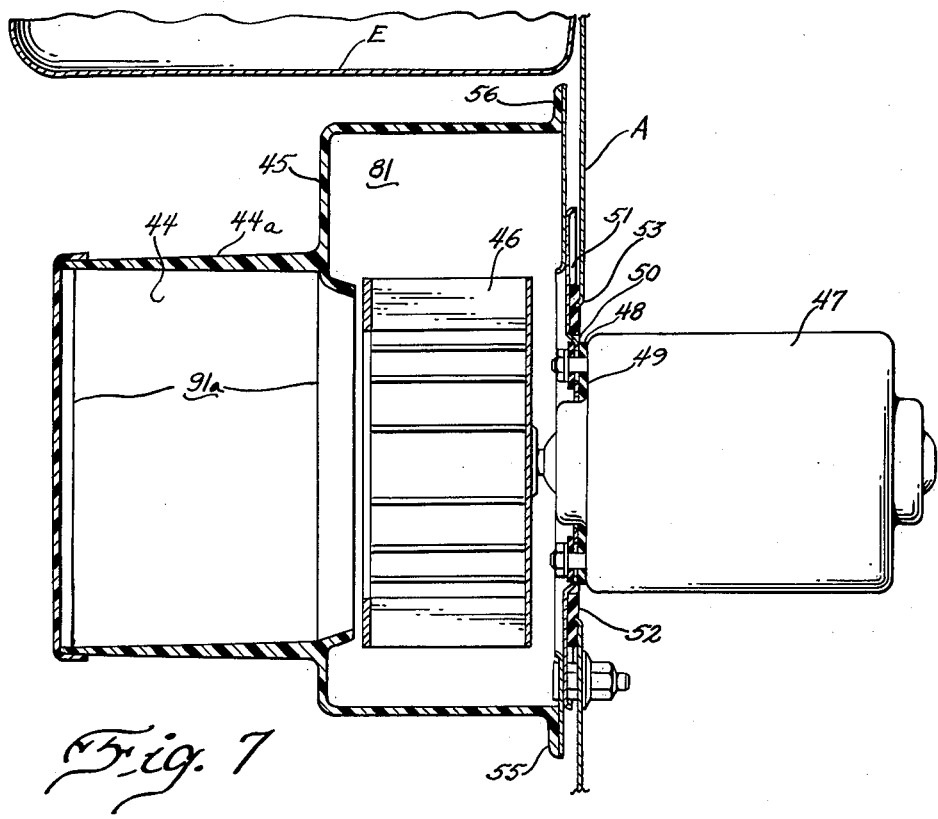
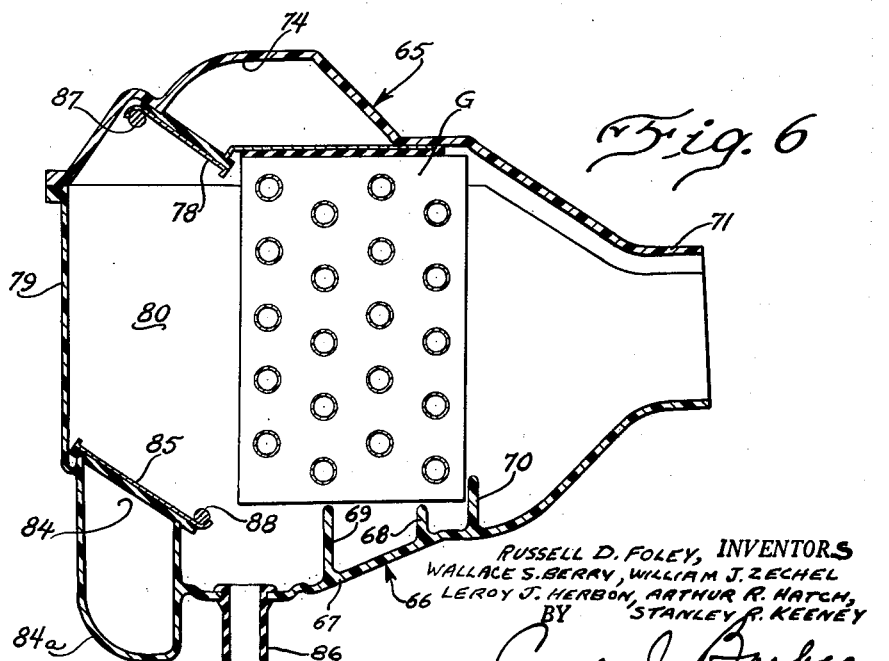

United States Patent Office 3,219,103
Patented Nov. 23, 1965

3,219,103
AIR CONDITIONING APPARATUS FOR
AUTOMOTIVE VEHICLE
Wallace S. Berry, William J. Zechel, and Leroy J. Herbon, Detroit, Arthur R. Hatch, Plymouth, Stanley R. Keeney, Detroit, and Russell D. Foley, Garden City, Mich., assignors to American Motors Corporation, Kenosha, Wis., a corporation of Maryland
Filed Sept. 27, 1963, Ser. No. 312,100
6 Claims. (Cl. 165—42)

The invention relates to an air conditioning system for an automotive vehicle wherein heated air is provided for the passenger compartment when the temperature outside the vehicle is below normal and refrigerated air is provided for the passenger compartment when the temperature outside the vehicle is above normal.

In general, the invention is directed to an improved air conditioning system in which the heat radiating core and the heat absorbing core together with associated components are arranged in the passenger compartment at the instrument panel of the vehicle.

The principal object is to provide a generally improved system of the type hereinafter fully described.

A specific object is to provide a generally improved air routing and damper valve arrangement.

Another object is to provide an improved arrangement of housings for such an air conditioning system.

A further object is to provide an air conditioning system in which the vehicle body panelling is employed in the general system of air routing.

Another object is to provide in an air conditioning system, a multiple damper arrangement with singular control for use when converting from an air heating to an air cooling condition.

Other objects and advantages of the invention will be apparent from the ensuing specification and appended drawings in which:

FIGURE 6 is an enlarged fragmentary sectional detail view taken on the line 6—6 of FIGURE 2.

FIGURE 7 is an enlarged fragmentary sectional detail view taken on the line 7—7 of FIGURE 2.

Figures 1, 2, 3:
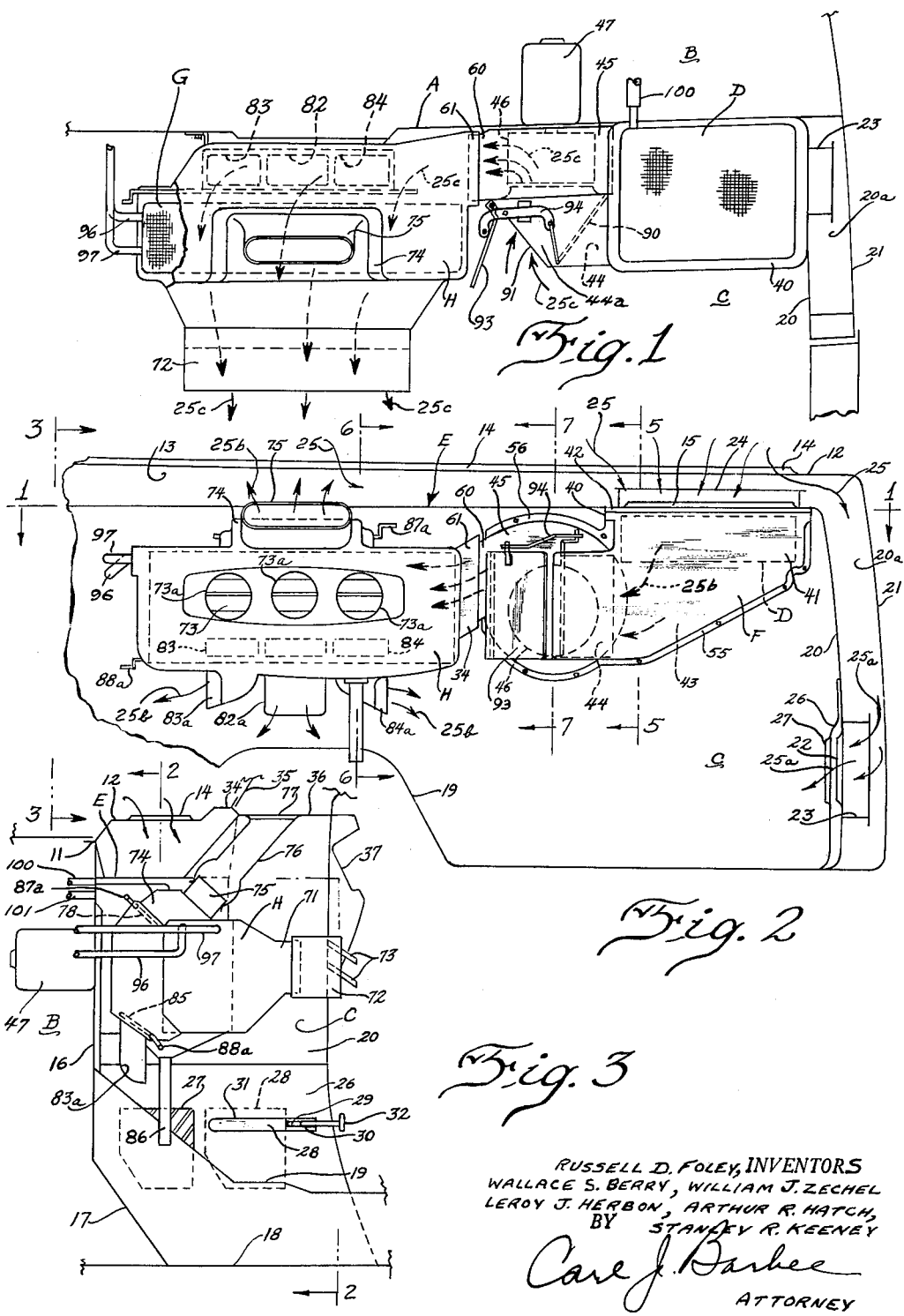
FIGURE 1 is a schematic plan view of the air conditioning system taken on the line 1—1 of FIGURE 2.
FIGURE 2 is a schematic front elevational view of the air conditioning system of FIGURE 1 taken on the line 2—2 of FIGURE 3.
FIGURE 3 is a schematic end elevational view of the air conditioning system of FIGURES 1 and 2 and taken generally on the line 3—3 of FIGURE 2.

Referring to FIGURES 1, 2 and 3, there is shown generally a portion of a passenger type automobile with a "dash" panel A separating the engine compartment B from the passenger compartment C.

The heat radiating core D is arranged within air reception housing F immediately beneath the body panel or cowl sub-panel and the heat absorbing core G is mounted within air distribution housing H.

The operation of the heat radiating core includes a water circulation system which will be explained hereinafter and which functions to supply heated water to the core. In the operation of the heat absorbing core (which will be referred to hereinafter as the "cooling" core), a refrigeration system is employed wherein a refrigerant is passed through the core—the refrigeration system being explained more fully hereinafter.

The "dash" panel A terminates at its upper end at 11 (see FIGURE 3) at the juncture of the "dash" panel and cowl panel 12. The dash panel and cowl panel extend throughout substantially the width of the vehicle from one side to the opposite side thereof. The cowl sub-panel E likewise extends throughout the width of the vehicle in a manner so as to be spaced from the cowl panel (as viewed in FIGURES 2 and 3) to form an air reception chamber 13 therebetween. The cowl panel is provided with an air entrance opening 14 to permit outside air to enter the reception chamber. The cowl sub-panel is likewise provided with an opening 15 situated directly above the heat radiating core.

The dash panel includes the generally vertical wall 16 which merges with the inclined toe board portion 17, which in turn merges with the floor 18. Along the longitudinal center line of the vehicle body a tunnel 19 is formed in the floor for accommodating the vehicle transmission (not shown) and other components of the driving apparatus leading from the engine (not shown) to the rear wheels (not shown) of the vehicle.

The dash panel terminates at either side of the vehicle by merging with the inner side wall panels 20 (only one of which is shown in FIGURES 1, 2 and 3). The outer side wall panels 21 (only one of which is shown) are spaced from the inner side wall panels to provide an air route leading to the air discharge outlets 22. It will be understood that the general construction of the inner and outer side wall panels and air discharge outlet 22 will be substantially identical on either side of the vehicle, consequently, the construction details are only shown for one side of the vehicle. Surrounding each air discharge outlet 22 is a box-like member 23 which serves as a rain shedder to prevent any rain water which enters cowl opening 14 from gaining access into the passenger compartment of the vehicle. A rain shedding baffle 24 would likewise be situated above the air entrance opening 15 to prevent rain water from gaining entry into such opening.

The air discharge outlets 22 provide for fresh air being supplied into the passenger compartment by the direct route through cowl opening 14, air route 20a and thence through the discharge outlets 22, such fresh air being indicated by the arrows 25a.

Spaced from the inner side wall panels 20 are secondary insert panels 26 with air discharge outlets 27 which are in registry with the discharge outlets 22. The secondary insert panels are spaced from the vehicle side wall panels adequately to accommodate sliding damper valves 28, one of which on one side of the vehicle is shown only in FIGURE 3. Each damper valve is provided with a projecting boss 29 which is offset at 30 so as to project through the panel slot 31 to provide a handle portion 32 which can be manually grasped to slide the damper valve forwardly and rearwardly of the vehicle for selectively closing off the panel opening 27 as desired. The damper valve is shown in retracted position in FIGURE 3 wherein the discharge openings 27 are fully open. It should be noted that the damper valve is removed in FIGURE 2. At this point, it should also be noted that in FIGURE 1, which is a plan view, both the cowl panel and the cowl panel and the cowl sub-panel are removed.

The cowl panel 12, which is situated exteriorly of the vehicle, terminates at 34 adjacent the lower edge of the windshield 35 (see FIGURE 3). Within the passenger compartment of the vehicle a ledge 36 extends crosswise of the vehicle throughout the width thereof, terminating at either end adjacent the side wall panels 20. A panel 37, customarily referred to as the instrument panel, projects rearward and downward from the ledge 36 and extends crosswise of the vehicle, thus serving largely to close off from the view of the vehicle passengers most of the components of the air conditioning system. At this point, it should be noted that all of the components of the air conditioning system are situated within the passenger compartment, immediately rearwardly of the dash panel wall 16, with exception of the blower motor.

Referring now more specifically to the components of the air conditioning system, the housing F may be formed of a synthetic resin material or any other suitable material and includes an uppermost generally rectilinear flange portion 40 which circumscribes the box-like chamber portion 41 within which the heating core D is nested. A flexible gasket 42 may be interposed between the flange 40 and the underside of the cowl sub-panel E for preventing the escape of air which travels through opening 15 before traveling through the heated core. Beneath the box-like portion 41 is a reception chamber 43 which communicates with the air transfer chamber 44 leading to the interior of the blower housing 45. A centrifugal type blower 46 is mounted within the blower housing 45 and is activated by blower motor 47 which is secured to the dash panel A (as best shown in FIGURE 7) on the engine compartment side thereof.

A suitable gasket 48 may be interposed between the end face 49 of the blower motor and the mounting portion 50 of the bracket 51 which is anchored to the dash panel A. A suitable gasket 52 is interposed between the flange portion 53 of the dash panel opening and the bracket 51 for preventing escape of air from the blower housing.

Figure 5:
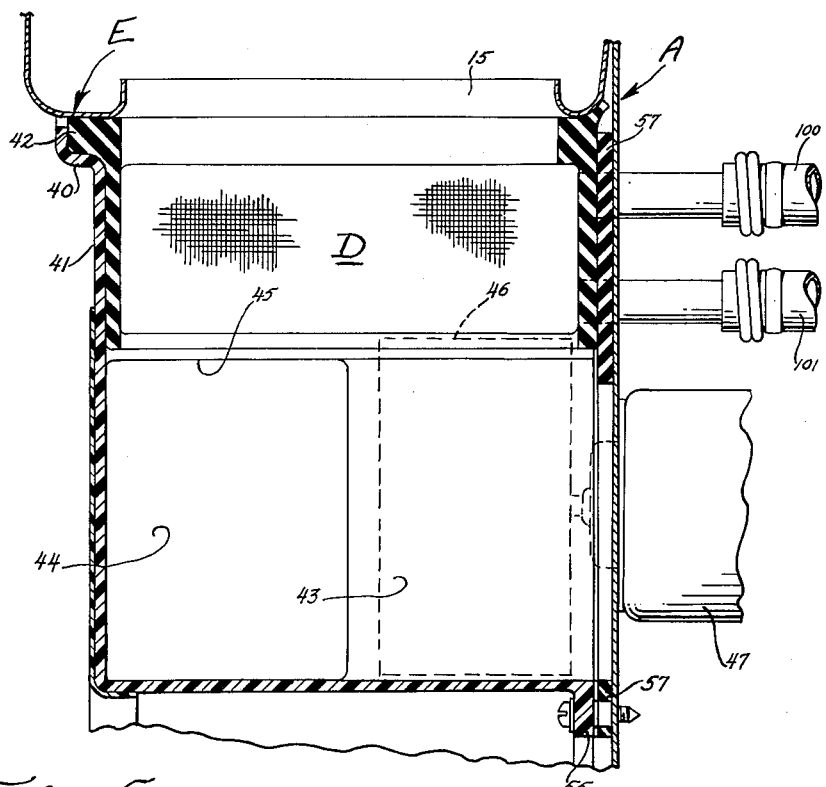
FIGURE 5 is an enlarged fragmentary sectional detail view taken on the line 5—5 of FIGURE 2.

The housing F has a flange 55 along its lower edge and a flange 56 along its upper edge for mounting the housing with reference to the dash panel A and suitable gasket material 57 (see FIGURE 5) which is interposed between the flanges 55 and 56 and the dash panel, wherever necessary, to prevent air escaping from the housing F. The housing F terminates with an end portion 60 which is telescopically received within the entrance portion 61 of the air distribution housing H.

The housing H includes an upper half 65 which is connected to the lower half 66 to form an enclosure within which the cooling core G is housed, as best viewed in FIGURE 6. The floor portion 67 of the housing may be provided with suitable baffles 68 and 69 situated beneath the cooling core. A suitable rib 70 may be situated immediately forwardly of the cooling core. The upper and lower halves of the housing terminate with the forwardly protruding discharge portion 71 to which an air discharge hood 72 is secured. The hood is provided with adjustable air deflector 73 which can be closed when the cooling system is not in use.

The upper half of the housing is provided with a chamber portion 74 situated above the cooling core and an air discharge neck 75 receives the lower end of defroster duct 76 which directs a stream of air through suitable outlet openings 77 onto the windshield 35 for defrosting purposes. Air for defrosting purposes is selectively controlled by means of damper valve 78. The rear wall 79 of housing H is spaced from the cooling core G sufficiently to provide an air distribution chamber 80 which is in open communication with the blower chamber 81. A drain pipe 86 is mounted in the floor of the housing and extends through the tunnel wall 19 to drain off water occasioned by moisture condensation from the cooling core. The lower portion of housing H is provided with three air discharge outlet openings 82, 83 and 84 which are controlled by the damper valve 85. The air which travels through opening 82 is discharged through the central duct 82a and the air traveling through openings 83 and 84 are discharged towards opposite sides of the vehicle through ducts 83a and 84a.

Each of the damper valves 78 and 85 are mounted on suitable actuating rods 87 and 88 terminating with crank portions 87a and 88a. The crank ends of the rods are shown in a manner requiring manual grasping for rotating the rods to open or close the dampers as desired, however, in practice each of the damper control rods would be associated with a Bowden wire control having a control knob situated on the instrument panel or other location readily accessible to the driver of the vehicle. The Bowden wire controls are not disclosed since they do not form the subject matter of the invention.

The air transfer passage 44 leading from the air reception chamber beneath the heating core to the blower chamber is selectively controlled as to the passage of air therethrough by means of the damper valve 90. The end face 91 of the housing portion 44a is open (as indicated in FIGURE 7 by the numeral 91a) to the interior of the passenger compartment and the opening is controlled by damper valve 93 (such valve being removed in FIGURE 7). A link 94 interconnects the damper valves 90 and 93 so that when actuated, the closing of valve 93 simultaneously effects the opening of valve 90 and vice versa. The reason for this will be explained hereinafter.

The cooling core is supplied with a refrigerant which travels into and out of the core through suitable conduits 96 and 97. A conventional refrigerating system involves the use of an air conditioning compressor 99, driven by the vehicle engine, and a condenser as well as other conventional components of a refrigerating system for an automotive vehicle, none of which components are shown other than the compressor and its associated clutch 125, cooling core G and the refrigerant conduits 96 and 97 leading to and from the core. The remaining components of the refrigerating system form no part of the invention and hence are not disclosed.

The heating core D has the fluid conduits 100 and 101 which supply heated water into and out of the core as needed. The heating system is conventional and the hot water for the heating core is supplied in a conventional manner from the supply of water in the engine block. A temperature responsive valve controls the supplying of hot water to the heating core as needed. None of the components of the heating system are shown other than the heating core and the water inlet and outlet conduits since the remaining components form no part of the invention.

Figure 4:
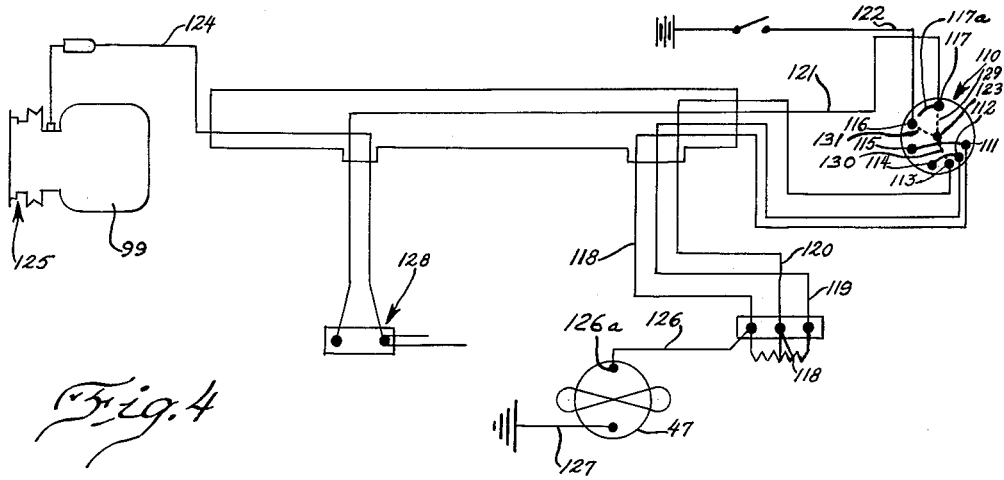
FIGURE 4 is a wiring diagram illustrating the electrical circuitry involved in the air conditioning system.

Referring to FIGURE 4, there is shown a preferred form of electrical system utilized in conjunction with the air conditioning system. The main control switch, identified generally by the numeral 110, serves to control the electrical systems for air heating and also air cooling.

The terminals 111, 112 and 113 represent the high, low and medium speed terminals, respectively, for use when the cooling system is in operation and terminals 114 and 115 represent the low and high speed terminals, respectively, when the heating system is in operation. Terminals 116 and 117 are the battery and magnetic clutch terminals, respectively.

Conductor wires 118, 119 and 120 extend from the terminals 111, 112 and 113 respectively, to the resistor assembly 118a. When the cooling system is in use under low speed operation, the electric current passes through terminal 112, conductor 119 and thence through the full extent of the resistor and then through conductor 126 to the motor terminal 126a, thereby effecting low speed operation of the motor 47. For high speed operation, the electric current passes through terminal 111, conductor 118 and conductor 126, by-passing the resistor and thereby effecting full speed operation of the motor.

When the electric current passes through terminals 113, 120 and conductor 126, a portion of the resistor is used, thereby effecting a medium speed operation of the motor 47.

The switch 110 is of the type in which a knob (not shown) is connected to a rod 123 for rotation to effect the desired circuitry. The switch is shown diagrammatically in FIGURE 4 and the rod has contact arms 129, 130 and 131 for selective engagement with the terminals as desired. Contact arm 131 is continuously in electrical contact with terminal 116 and with the other arms 129 and 130. When contact arm 130 is in contact with either of terminals 111, 112 or 113, the contact arm 129 remains in contact with terminal 117 which has an extension 117a for this purpose. Thus electric current is available to the magnetic clutch 125 whenever the thermally responsive switch 128 is closed causing operation of the compressor 99.

During operation of the heating system, contact arm 130 will be engaged with terminal 114 or 115 and arm 129 will be disengaged from terminal 117. The motor 47 will be energized for low or high speed operation as desired since the terminal 115 is permanently electrically connected to terminal 111 and terminal 114 is permanently electrically connected to terminal 112.

*Operation*

It will be understood that both the heating and the cooling features of the air conditioning system may be utilized either while the vehicle is standing still or while it is in motion.

Under a condition in which the vehicle is moving forwardly, the operation of the system may be as follows. The forward movement of the vehicle causes the atmospheric air indicated by the arrows 25 to enter the cowl opening 14 under pressure—this air being referred to as "ram" air. If damper valve 90 were closed, as shown in dotted lines in FIGURE 1, and if the sliding dampers 28 were opened, then such ram air would be delivered directly through passage 20a and openings 22 and 27 into the passenger compartment of the vehicle. This is fresh atmospheric air at atmospheric temperature. If damper valve 90 were opened, some of the ram air would travel through the heater core D thence through air chambers 43 and 44, through blower housing 45 into air chamber 80 from whence it would travel into the passenger compartment either through opening 77 or outlet hood 72 or ducts 82a, 83a and 84a depending upon whether deflectors 73 or damper valves 78 and 85 are opened or closed. Such a use of the system might occur on a mild day when neither heating nor cooling of the passenger compartment is desired, however, a small amount of fresh air would be introduce into the passenger compartment. With the side dampers 28 closed and damper valve 90 opened and assuming that the weather conditions are such that heated air entering the passenger compartment is desired, then such conditions can be obtained either with or without the operation of the blower 46. If the blower is not in operation, then the ram air enters cowl opening 14, cowl sub-panel opening 15, through the heat radiating core D, air chambers 43 and 44, blower housing 45 and into air chamber 80 for distribution selectively through opening 77 and ducts 82a, 83a and 84a or outlet hood 72 (hood 72 is normally used only in connection with air cooling and usually deflectors 73 will be closed when the heating core D is in use). The volume of heating air being supplied into the passenger compartment is greatly enhanced by operating the blower 46 and under extreme cold weather conditions, the blower motor would always be used in conjunction with the heating of the passenger compartment. It would also be necessary to use the blower to heat the passenger compartment whenever the vehicle is standing still since no ram air would be available. Under some conditions, dampers 78 and 85 would both be opened so that some of the heated air would be directed onto the windshield for defrosting purposes while the balance of the heated air would be discharged into the passenger compartment through openings 82, 83 and 84. It will be noted that damper valve 93 is closed during use of the heating system. In FIGURE 2 the various directional arrows 25b indicate the air routes when the heating system is in use. In FIGURE 1 the various directional arrows 25c indicate the air routes when the cooling system is in use.

When it is desired to cool the interior of the passenger compartment, then damper 93 is opened and damper 90 is simultaneously closed, thus, atmospheric ram air is closed off at the damper valve 90. The blower 46 is always operated during actuation of the cooling core G. Damper valves 78 and 85 are closed, as shown in FIGURE 6, so that all of the air entering chamber 80 is directed through the cooling core G and thence out through the discharge outlet hood 72, deflectors 73 being opened. During operation of the cooling system, air is drawn through the housing opening 91a, then through the blower housing 45, into chamber 80, through the cooling core G and then discharged through the opening 73a. It will be noted that the air which is utilized for the cooling system is identified as re-circulated air in that the air which travels through the blower comes from within the passenger compartment of the vehicle. If desired, one of the damper valves 28 may be opened slightly to permit entrance of atmospheric ram air into the interior of the passenger compartment to add fresh air to the supply of re-circulated air which travels through opening 91.

As previously mentioned, when the heating core D is in use, the heating of the core is effected by means of a conventional arrangement wherein heated water from the engine block is directed through the inlet conduit 100 and thence through the heating core and then returned to the engine block through the outlet conduit 101. A thermostatically responsive control valve (not shown) would be installed in the water route and when the valve is fully opened, a full flow of heated water travels through the heating core D and a partial opening of the valve would permit only a limited quantity of water to travel through the core. The setting of the valve would determine the resultant temperature within the passenger compartment. This part of the heating system is conventional and hence is not disclosed.

When the cooling core G is being used, a conventional refrigeration system is employed therewith and the evaporator of such system is identified herein as being the cooling core. In such a refrigerating system, a compressor 99 which is driven by the vehicle engine through a magnetically controlled clutch 125 pumps a refrigerant through high pressure conduits (not shown), a condenser (not shown), check valves (not shown), receiver (not shown), expansion valve (not shown), then through the cooling core and thence back through a low pressure conduit (not shown), back to the compressor. The refrigeration system is conventional and hence is not shown herein except for the cooling core and the inlet and outlet conduits.

We claim:

1. In an air conditioning system for an automotive vehicle having an engine compartment and a passenger compartment, an air conditioning apparatus comprising: a dash panel separating the engine compartment from the passenger compartment; a cowl panel projecting rearwardly from the dash panel and having an opening therein exposed to atmosphere; a cowl sub-panel situated beneath the cowl panel and spaced therefrom to provide an air reception chamber therebetween; an air reception housing situated beneath the cowl sub-panel, rearwardly of the dash panel and within the passenger compartment, said air reception housing being open at one end and such open end being directed toward the cowl sub-panel; said cowl sub-panel having an opening therein for establishing communication between the interior of the air reception chamber and the interior of the air reception housing; a heat radiating core mounted in the air reception housing at the open end thereof and beneath the cowl sub-panel opening; means for activating the heat radiating core; a blower housing situated rearwardly of the dash panel, within the passenger compartment and alongside of the air reception housing, the interior of the blower housing being in communication with the interior of the air reception housing; an air distribution housing situated rearwardly of the dash panel, within the passenger compartment and alongside of the blower housing at the end thereof remote from the end at which the air reception housing is situated, the interior of the air distribution housing being in communication with the interior of the blower housing; said air reception housing, blower housing and air distribution housing being arranged consecutively, in substantial longitudinal alignment, crosswise of the vehicle and beneath the cowl sub-panel; said air distribution housing having air discharge openings therein.

2. In an air conditioning system for an automotive vehicle having an engine compartment and a passenger compartment, an air conditioning apparatus comprising: a dash panel separating the engine compartment from the passenger compartment; a cowl panel projecting rearwardly from the dash panel and having an opening therein exposed to atmosphere; a cowl sub-panel situated beneath the cowl panel and spaced therefrom to provide an air reception chamber therebetween; an air reception housing situated beneath the cowl sub-panel, rearwardly of the dash panel and within the passenger compartment, said air reception housing being open at one end and such open end being directed toward the cowl sub-panel; said cowl sub-panel having an opening therein for establishing communication between the interior of the air reception chamber and the interior of the air reception housing; a heat radiating core mounted in the air reception housing at the open end thereof and beneath the cowl sub-panel opening; means for activating the heat radiating core; a blower housing situated rearwardly of the dash panel, within the passenger compartment and alongside of the air reception housing, the interior of the blower housing being in communication with the interior of the air reception housing; an air distribution housing situated rearwardly of the dash panel, within the passenger compartment and alongside of the blower housing at the end thereof remote from the end at which the air reception housing is situated; a cooling core situated within the air distribution housing; said air distribution housing having an air distribution chamber situated forwardly of the cooling core and air discharge openings in communication with the air distribution chamber, said air reception housing, blower housing and air distribution housing being arranged consecutively, in substantial longitudinal alignment, crosswise of the vehicle and beneath the cowl sub-panel.

3. In an air conditioning system for an automotive vehicle having an engine compartment and a passenger compartment, an air conditioning apparatus comprising: a substantially vertical dash panel separating the engine compartment from the passenger compartment; a substantially horizontal cowl panel projecting rearwardly from the dash panel and having an opening therein exposed to atmosphere; a cowl sub-panel situated beneath the cowl panel and spaced therefrom to provide an air reception chamber therebetween; an air reception housing situated rearwardly of and adjacent the dash panel, beneath the cowl sub-panel and within the passenger compartment, said air reception housing being open at one end and such open end being directed upwardly toward the cowl sub-panel; said cowl sub-panel having an opening therein for establishing communication between the interior of the air reception chamber and the interior of the air reception housing; a heat radiating core mounted in the air reception housing at the open end thereof and beneath the cowl sub-panel opening; means for activating the heat radiating core; a blower housing situated rearwardly of and adjacent the dash panel, within the passenger compartment and alongside of the air reception housing, the interior of the blower housing being in communication with the interior of the air reception housing; a blower fan in the blower housing and means for activating the fan; an air distribution housing situated rearwardly of and adjacent the dash panel, within the passenger compartment and alongside of the blower housing at the end thereof remote from the end at which the air reception housing is situated, the interior of the air distribution housing being in communication with the interior of the blower housing; said air reception housing, blower housing and air distribution housing being arranged consecutively, in substantial longitudinal alignment, crosswise of the vehicle and beneath the cowl sub-panel; said air distribution housing having air discharge openings therein.

4. In an air conditioning system for an automotive vehicle having an engine compartment and a passenger compartment, an air conditioning apparatus comprising: a substantially vertical dash panel separating the engine compartment from the passenger compartment; a cowl panel projecting rearwardly from the dash panel and having an opening therein exposed to atmosphere; a cowl sub-panel situated beneath the cowl panel and spaced therefrom to provide an air reception chamber therebetween; an air reception housing situated beneath the cowl sub-panel, rearwardly of the dash panel and within the passenger compartment, said air reception housing being open at one end and such open end being directed toward the cowl sub-panel; said cowl sub-panel having an opening therein for establishing communication between the interior of the air reception chamber and the interior of the air reception housing; a heat radiating core mounted in the air reception housing at the open end thereof and beneath the cowl sub-panel opening; means for activating the heat radiating core; a blower housing situated rearwardly of the dash panel, within the passenger compartment and alongside of the air reception housing; said air reception housing having an air transfer passage leading to the interior of the blower housing; a damper valve within the air reception housing for selectively closing off the air transfer passage; an air distribution housing situated rearwardly of the dassh panel, within the passenger compartment and alongside of the blower housing at the end thereof remote from the end at which the air reception housing is situated, the interior of the air distribution housing being in communication with the interior of the blower housing; said air reception housing, blower housing and air distribution housing being arranged consecutively, in substantial longitudinal alignment, crosswise of the vehicle and beneath the cowl sub-panel; said air distribution housing having air discharge openings therein and damper valves for selectively closing off said air discharge openings.

5. In an air conditioning system for an automotive vehicle having an engine compartment and a passenger compartment, an air conditioning apparatus comprising: a dash panel separating the engine compartment from the passenger compartment; a cowl panel projecting rearwardly from the dash panel and having an opening therein exposed to atmosphere; a cowl sub-panel situated beneath the cowl panel and spaced therefrom to provide an air reception chamber therebetween; an air reception housing situated beneath the cowl sub-panel, rearwardly of the dash panel and within the passenger compartment, said air reception housing being open at one end and such open end being directed toward the cowl sub-panel; said cowl sub-panel having an opening therein for establishing communication between the interior of the air reception chamber and the interior of the air reception housing; a heat radiating core mounted in the air reception housing at the open end thereof and beneath the cowl sub-panel opening; means for activating the heat radiating core; a blower housing situated rearwardly of the dash panel, within the passenger compartment and alongside of the air reception housing; said air reception housing having an air transfer passage therein leading to the interior of the blower housing; a first damper valve mounted within the air reception housing for selectively closing off the air transfer passage; said air reception housing having a re-circulation air entrance opening in one wall thereof; a second damper valve for selectively closing off the re-circulation air entrance opening; an air distribution housing situated rearwardly of the dash panel, within the passenger compartment and alongside of the blower housing, at the end thereof remote from the end at which the air reception housing is situated, the interior of the air distribution housing being in communication with the interior of the blower housing; said air reception housing, blower housing and air distribution housing being arranged consecutively, in substantial longitudinal alignment, crosswise of the vehicle and beneath the cowl sub-panel; said air distribution housing having a forward portion with an air distribution chamber therein; a cooling core mounted within the air distribution housing rearwardly of the air distribution chamber; the air distribution chamber having upper and lower walls with air discharge openings therein; third and fourth damper valves within the air distribution chamber for selectively closing off the air discharge openings in the upper and lower walls of the air distribution chamber; said air distribution housing having an additional air discharge opening situated rearwardly of the cooling core.

6. An air conditioning system for an automotive vehicle as set forth in claim 5 wherein the first and second damper valves are mechanically interconnected, whereby a closing of the first damper valve effects an opening of the second damper valve and vice versa.

References Cited by the Examiner
UNITED STATES PATENTS

| | | | |
|---|---|---|---|
| 2,104,394 | 1/1938 | Halbleib | 98—2.1 |
| 2,306,796 | 12/1942 | Staley et al. | 98—2 |
| 2,780,077 | 2/1957 | Jacobs | 165—43–X |
| 2,864,590 | 12/1958 | Moore | 165—43 |
| 2,876,998 | 3/1959 | Csabi | 165—43 |
| 2,919,907 | 1/1960 | Simons | 165—43 |
| 3,008,400 | 11/1961 | Barenyi | 98—2.1 |

FOREIGN PATENTS 820,256  9/1959  Great Britain.

ROBERT A. O'LEARY, *Primary Examiner.*

CHARLES SUKALO, *Examiner.*